(12) United States Patent
Arvidson et al.

(10) Patent No.: US 9,825,879 B2
(45) Date of Patent: Nov. 21, 2017

(54) METHOD AND ARRANGEMENT FOR ADMISSION CONTROL BASED ON PRIORITY LEVEL BASED DIFFERENTIATION

(71) Applicant: Telefonaktiebolaget L M Ericsson (publ), Stockholm (SE)

(72) Inventors: Pontus Arvidson, Stockholm (SE); Magnus Hurd, Stockholm (SE); Christian Skärby, Stockholm (SE); Richard Tano, Stockholm (SE); Ylva Timner, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 14/435,485

(22) PCT Filed: Oct. 17, 2012

(86) PCT No.: PCT/EP2012/070579
§ 371 (c)(1),
(2) Date: Apr. 14, 2015

(87) PCT Pub. No.: WO2014/060032
PCT Pub. Date: Apr. 24, 2014

(65) Prior Publication Data
US 2015/0271101 A1    Sep. 24, 2015

(51) Int. Cl.
*G01R 31/08* (2006.01)
*H04L 12/911* (2013.01)
(Continued)

(52) U.S. Cl.
CPC .......... *H04L 47/821* (2013.01); *H04L 47/805* (2013.01); *H04L 47/824* (2013.01); *H04W 48/06* (2013.01)

(58) Field of Classification Search
USPC ..... 370/230, 230.1, 231, 235, 252, 328, 338
See application file for complete search history.

(56) References Cited

U.S. PATENT DOCUMENTS

| 2005/0070230 | A1  | 3/2005 | Das et al. |
| 2009/0109900 | A1* | 4/2009 | Kubota ............... H04L 12/5695 370/328 |

(Continued)

OTHER PUBLICATIONS

3rd Generation Partnership Project, "3rd Generation Partnership Project; Technical Specification Group Radio Access Network; Evolved Universal Terrestrial Radio Access Network (E-UTRAN); S1 Application Protocol (S1AP) (Release 9)", Technical Specification, 3GPP TS 36.413 V9.4.0, Sep. 1, 2010, pp. 1-241, 3GPP, France.

(Continued)

*Primary Examiner* — Christine Ng
(74) *Attorney, Agent, or Firm* — Coats & Bennett, PLLC (57) ABSTRACT

The invention relates to a network node and a method therein for admission control in a wireless communication system. The method comprises receiving a request for a bearer setup from a requesting entity, where the request and/or bearer is associated with a priority level P. The method further comprises obtaining, e.g. receiving or retrieving, reports indicating a priority blocking level, BLi, per monitored system resource, i, needed for setting up a bearer. The method further comprises determining a general priority blocking level BLG, based on the reports. Further, the method comprises deciding whether to accept or reject the request for a bearer setup based on the priority level P and the general priority blocking level BLG.

26 Claims, 8 Drawing Sheets

(51) Int. Cl.
*H04L 12/927* (2013.01)
*H04W 48/06* (2009.01)

(56) References Cited

U.S. PATENT DOCUMENTS

| | | | | | |
|---|---|---|---|---|---|
| 2010/0002579 | A1* | 1/2010 | Shi | ............ | H04L 12/5695 370/229 |
| 2010/0014422 | A1* | 1/2010 | Lee | ............ | H04L 47/14 370/230 |
| 2010/0157887 | A1* | 6/2010 | Kopplin | ............ | H04L 12/5695 370/328 |
| 2012/0051235 | A1* | 3/2012 | Kotecha | ............ | H04W 76/007 370/252 |
| 2012/0176894 | A1* | 7/2012 | Cai | ............ | H04L 47/11 370/230 |
| 2013/0322325 | A1* | 12/2013 | Hahn | ............ | H04W 36/0055 370/315 |

OTHER PUBLICATIONS

New Postcom, "Issues on MBMS Pre-emption", 3GPP TSG-RAN3#70, Jacksonville, FL, US, Nov. 15, 2010, pp. 1-2, R3-103179, 3GPP.

New Postcom, "Relations among Admission control, Counting and Preemption", 3GPP TSG-RAN3#70, Jacksonville, FL, US, Nov. 15, 2010, pp. 1-4, R3-103178, 3GPP.

* cited by examiner

METHOD AND ARRANGEMENT FOR ADMISSION CONTROL BASED ON PRIORITY LEVEL BASED DIFFERENTIATION

TECHNICAL FIELD

The suggested technology relates to admission control, especially to admission control in wireless communication systems, such as e.g. EUTRAN (Evolved Universal Terrestrial Radio Access Network), applying shared channels.

BACKGROUND

In wireless communication systems, the task of deciding whether to admit or reject a request from a UE (User Equipment) for a radio bearer setup is handled by a function denoted Admission Control. The Admission Control is typically located in a base station. A connected UE occupies resources for its services, such as e.g. radio transmission resources and licenses. The resources considered by Admission Control are herein referred to as Monitored System Resources (MSRs). For each MSR, it is the aggregated resource usage from existing bearers that is monitored. When a resource is exhausted, or "full", any further requests to set up a radio bearer, that requires said resource, are rejected by the Admission Control, regardless of the importance of the request.

In order to avoid that important requests are rejected, the concept of Allocation and Retention Priority (ARP) for radio bearers has been introduced by 3GPP ($3^{rd}$ Generation Partnership Project). In LTE (Long Term Evolution), a radio bearer is denoted E-RAB (Evolved-Radio Access Bearer). The ARP includes a "Priority Level", which is a parameter that describes how important an E-RAB is. Based on the Priority Level, the Admission Control may then prioritize amongst resource requests for setup of E-RABs by means of so-called pre-emption. That is, when one or more resources are exhausted (full) and yet another request for setup of an E-RAB is received, already admitted E-RABs may be pre-empted based on their ARP. Here, "pre-empt" refers to releasing or "shutting down" less important E-RABs.

MSRs may be divided into two main categories; dynamic MSRs and static MSRs. Dynamic MSRs are resources for which the utilization may vary during a bearer's lifetime. These variations may stem from decisions made in a scheduler, as well as from varying radio conditions or mobility.

Figure 1:
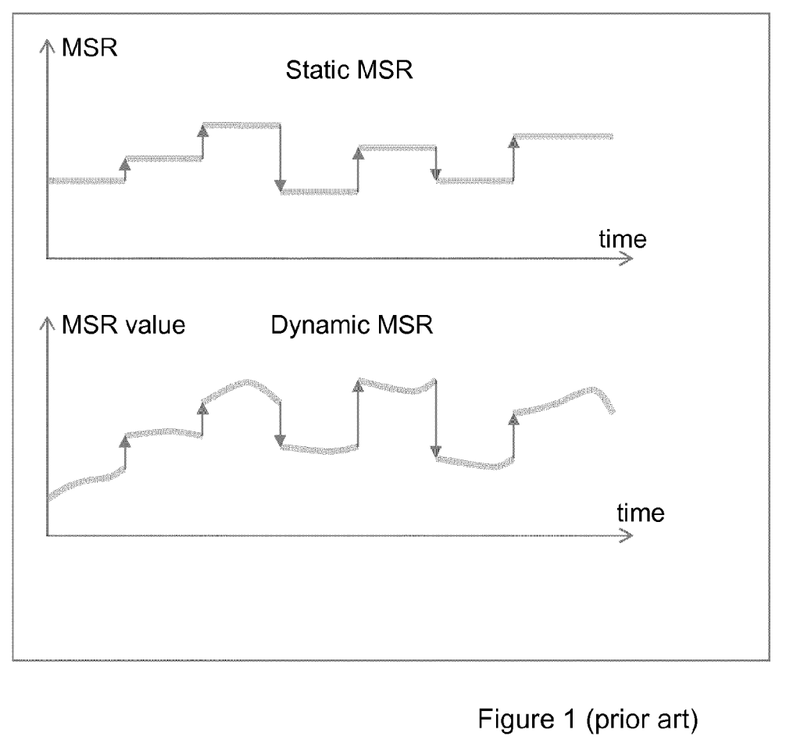
FIG. 1 illustrates static and dynamic MSRs. The arrows correspond to E-RAB Setup and E-RAB Release, respectively.
Figure 4:
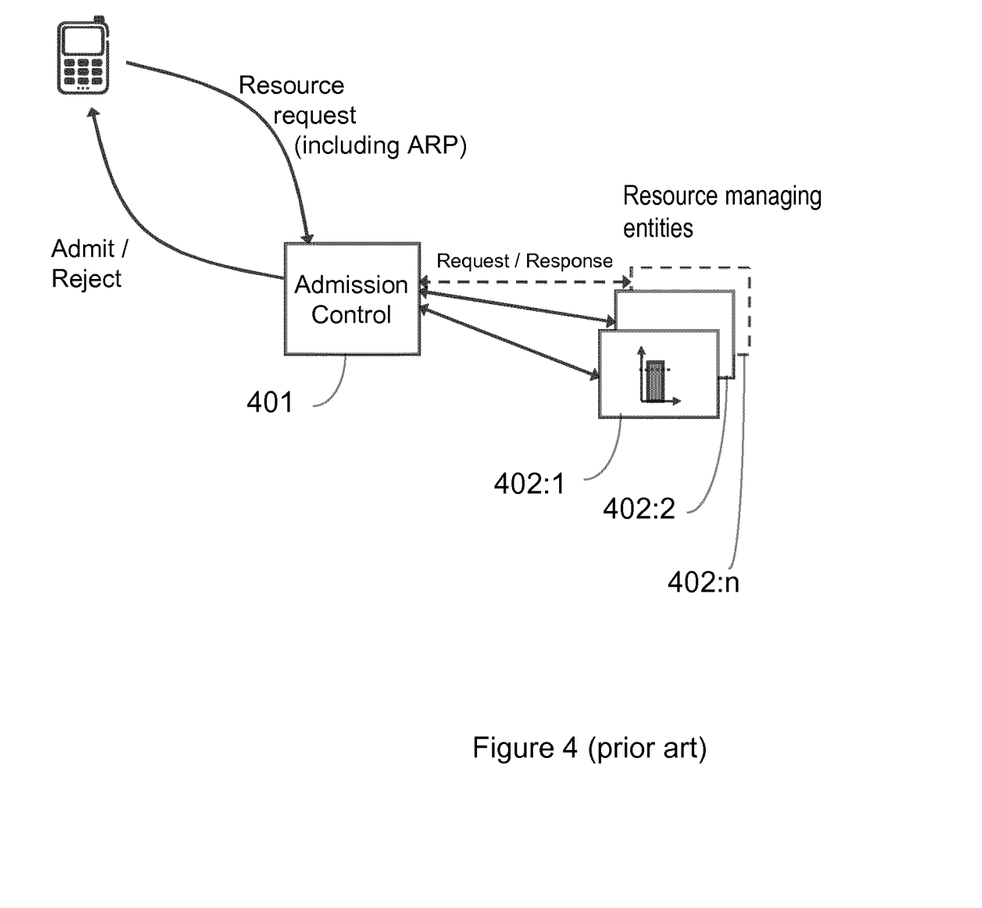
FIG. 4 shows the relation between Admission Control and MSRs, according to the prior art.

Static resources, on the other hand, are resources for which the usage does not vary during the lifetime of a bearer. These resources may relate to licenses or hardware/software limitations, or be related to a static model of an otherwise dynamic MSR. The difference in behavior between static and dynamic MSRs is illustrated in FIG. 1. A specific request for setup of a bearer is mapped by Admission Control on to the various MSRs. For a specific request, only some of the MSRs may be relevant. FIG. 4 illustrates how an Admission Control unit 401 receives a request for resources for a bearer set up. The Admission Control unit 401 then sends one request per MSR necessary for setting up the bearer. In FIG. 4, the MSRs are illustrated as to be managed by a number of resource managing entities 402:1-402:n. Each request is answered by a response indicating whether the requested resources may be allocated or not. If one or more responses are negative, the Admission Control rejects the request for bearer setup, and if all responses are positive, the request is admitted.

Some special considerations are needed for dynamic MSRs representing load due to radio bearers with a QoS (Quality of Service) requirement. If too many radio bearers with QoS requirements are admitted, scheduling will at some point fail to provide resources to all of them. Users and bearer setups may have been admitted at a point in time when radio conditions and mobility were favorable in the sense that QoS could be provided. But due to increasing mobility and worsened radio conditions the resources may at a later point in time not be sufficient to provide QoS for the admitted radio bearers. Admission Control strives for having the load due to radio bearers with QoS requirements below a QoS threshold expressed as a percentage of the maximum amount of the resource. It does so by rejecting requests for bearer set up whenever load due to existing bearers with QoS requirements is above the QoS threshold. The QoS threshold could, for instance, relate to the contribution from all the Guaranteed Bitrate Bearers (GBRs). The QoS threshold for a dynamic MSR is illustrated in FIGS. 2 and 3.

Figure 2:
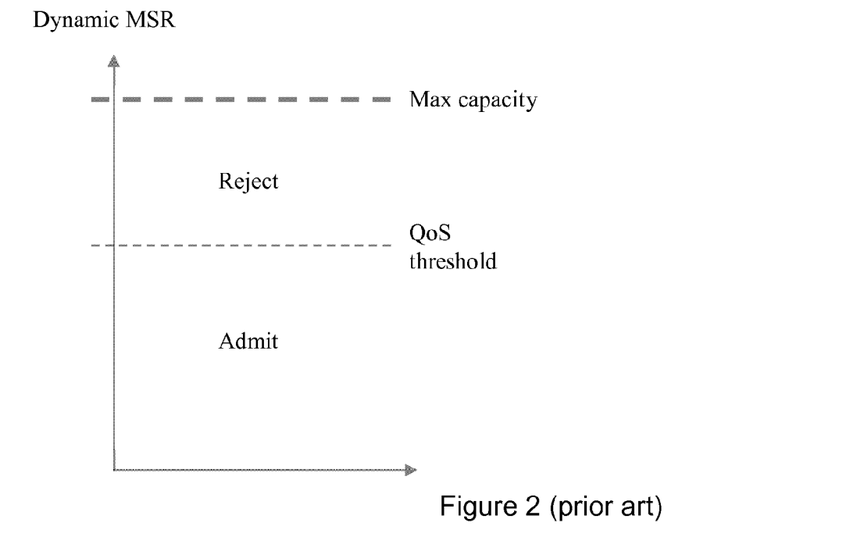
FIG. 2 shows Dynamic MSR with QoS threshold. For a static MSR the QoS threshold is not needed since there are no fluctuations in this case.
Figure 3:
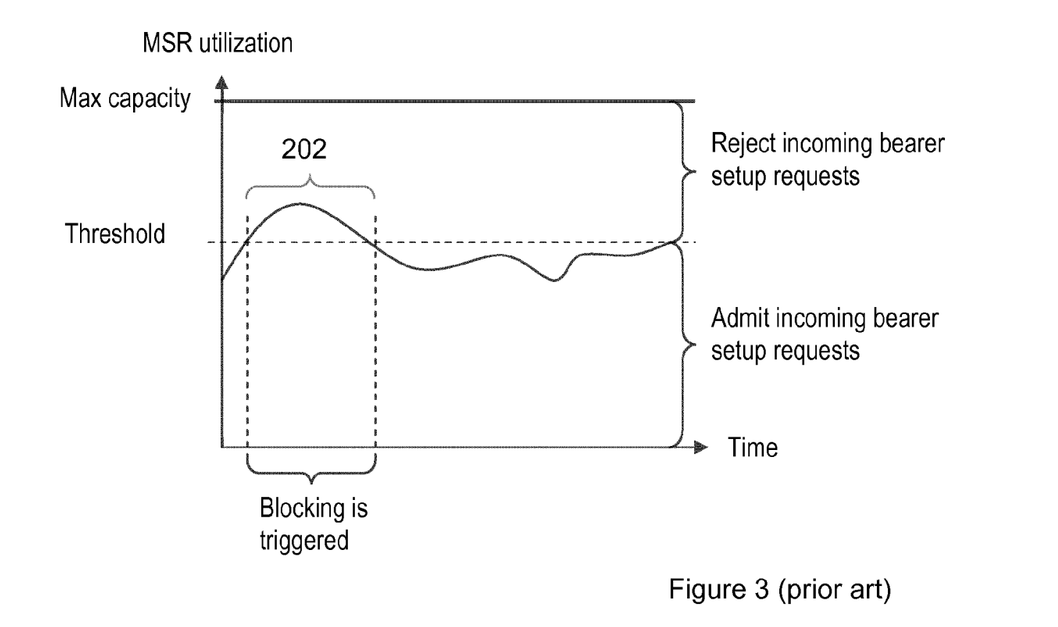
FIG. 3 illustrates a blocking function according to the prior art.

The margin created between a QoS threshold and a maximum level, Max Capacity, illustrated in FIGS. 2 and 3, allows for statistical fluctuations with regard to the air interface resources, since the load for high-priority QoS traffic can be limited to a value lower than the maximum level of the resource. Then integrity of the QoS radio bearers is protected with some level of probability, since resources above the threshold are available for the high-prioritized traffic in congested scenarios. Tuning the threshold makes it possible to adjust that probability. Tuning the margin between the threshold and the maximum level of the resource is of special interest when the high-prioritized traffic consists of GBR traffic, where service blocking is desired rather than service dropping. Further, this kind of Admission Control also helps protecting radio bearers without any QoS requirements, since there is a margin allowed for them to use. This means that dynamic MSRs are considered loaded (full) whenever the load exceeds the QoS threshold, whereas static resources can be considered loaded whenever the load equals the maximum level.

As previously described, pre-emption is a method for prioritizing amongst bearers of different priority levels when one or more required resources are loaded. However, pre-emption leads to that users abruptly lose their connection to the network, which is not good from a user experience perspective. Further, pre-emption is not allowed in some markets for certain services. Also, it is difficult to select the most suitable user or bearer to pre-empt. A usual way is to select and pre-empt the bearer that has the worst radio conditions. However, the user associated with this "worst" bearer is probably located close to the cell boarder, and might have be in the process to do a handover when being pre-empted, and would have left the cell anyway.

An alternative to pre-emption is the use of ARP-differentiated thresholds. This means that additional thresholds, one for each ARP, are introduced per MSR, such that radio bearers are admitted based on a comparison of the MSR load with the corresponding threshold. However, the use of such ARP-differentiated thresholds require a very involved configuration, since one threshold for each ARP Priority level needs to be configured per MSR.

A further method for prioritizing amongst bearers of different priority levels is so-called Timer-based blocking. Timer-based blocking means that the Admission Control starts to block radio bearers of certain ARP Priority Levels when there has been a reject from a congested MSR. Initially, all ARP Priority levels are blocked, followed by a timer-based relaxation one-by-one of allowed ARP Priority levels, such that finally all levels are again admitted (if there were no new rejects). However, Timer-based blocking becomes detached from the real resource situation in the MSRs. This is in particular valid for dynamic MSRs with a relation to scheduler-handled resources. It is therefore difficult to design proper settings of the timers.

SUMMARY

The herein suggested technology obviates at least some of the drawbacks described above and enables ARP-differentiated accessibility without use of pre-emption in a wireless communication system. This is achieved by use of a general priority blocking level in Admission Control, where the general blocking level is derived from a number of local blocking levels related to MSRs.

According to a first aspect, a method for admission control is provided in a network node in a wireless communication system. The method comprises receiving a request for a bearer setup from a requesting entity, where the request and/or bearer is associated with a priority level P. The method further comprises obtaining, e.g. receiving or retrieving, reports indicating a priority blocking level, BLi, per monitored system resource, i, needed for setting up a bearer. The method further comprises determining a general priority blocking level BLG, based on the reports. Further, the method comprises deciding whether to accept or reject the request for a bearer setup based on the priority level P and the general priority blocking level BLG.

According to a second aspect a network node is provided for admission control in a wireless communication system. The network node is operable in a wireless communication system, which may use shared channels for communication. The network node comprises a receiver, which is adapted to receive, from a requesting entity such as a UE, a request for bearer setup, associated with a priority level, P. The network node further comprises an admission controller, which is adapted to decide whether to accept or reject the request based on the priority level P and a general priority blocking level BLG, where BLG is determined based on reports indicating a priority blocking level BLi per monitored system resource, i, needed for setting up a bearer.

The above method and network node may be implemented in different embodiments. The priority blocking level BLi may be based on the usage of resource i, per priority level, P, of existing bearers and a predefined criterion, such as a threshold. Such a threshold may be related to the resource usage of resource i. Each BLi may indicate a priority blocking level for resource i, where a request for a bearer setup associated with a priority level P, which is too low, i.e. does not fulfill a predefined criterion, in relation to the indicated priority blocking level, should be rejected. A BLi may be calculated as the priority level associated with the used resources R, for which, when added to a sum, the sum fulfills the predefined criterion, where the sum is created by adding the number of used resources per priority level together, in descending priority level order, starting with the highest priority level.

The general priority blocking level BLG may be determined as the priority blocking level, which is associated with a highest priority level of the respective priority blocking levels BLi. The priority level P may be an allocation and retention priority level, such as ARP in LTE-type systems. The request may be for setup of a radio bearer, such as an E-RAB in an LTE-type system, or a transport bearer, such as an S1-bearer in an LTE-type system. The request may be for a UE-level resource, and the priority level assigned to the UE may be determined from the priority level of its E-RABs. Further, the outcome of the deciding may be indicated to the requesting entity.

According to a third aspect, a computer program is provided, which comprises computer readable code means, which when run in a network node according to the second aspect causes the network node to perform the corresponding method according to the first aspect.

According to a fourth aspect, a computer program product is provided, comprising computer program according to the third aspect.

One advantage of the technology suggested herein is that it enables ARP-differentiated accessibility without use of pre-emption. Further, the use of the suggested technology may reduce signaling due to resources requested by admission control with respect to the MSRs. Further, in case pre-emption is allowed, the use of the suggested technology reduces the frequency of pre-emption events. Further, the herein suggested technology provides a general method for differentiating accessibility with respect to ARP for both dynamic and static resources, which may deal with any number of monitored system resources.

BRIEF DESCRIPTION OF THE DRAWINGS

The suggested technology will now be described in more detail by means of exemplifying embodiments and with reference to the accompanying drawings, in which.

DETAILED DESCRIPTION

The herein suggested technical solution relates to the technical problem of differentiating accessibility with respect to Allocation and Retention Priority Level, e.g. when pre-emption is not allowed. As a result of using the herein suggested technical solution, requests for resources to set up an E-RAB with a more important ARP Priority Level are more likely to get admitted, at the expense of requests related to E-RABs with a less important ARP Priority Level. This may also be referred to e.g. as "ARP differentiation".

The herein suggested technology enables ARP based prioritization of accessibility without the use of pre-emption or multiple admission thresholds. The herein suggested technology involves collecting information on the usage of monitored system resources, per ARP level, and determining a blocking level for ARP, based on the resource usage in relation to a differentiation threshold. One local blocking level for ARP is determined for each monitored system resource, regardless if it is of static or dynamic type of resource. Then, the ARP associated with an E-RAB request, i.e. a request for set up of a new E-RAB, is compared with a general priority blocking level derived from the local priority blocking levels, e.g. the most aggressive local blocking level for ARP, to decide whether the E-RAB request shall be admitted or not.

Figure 6:
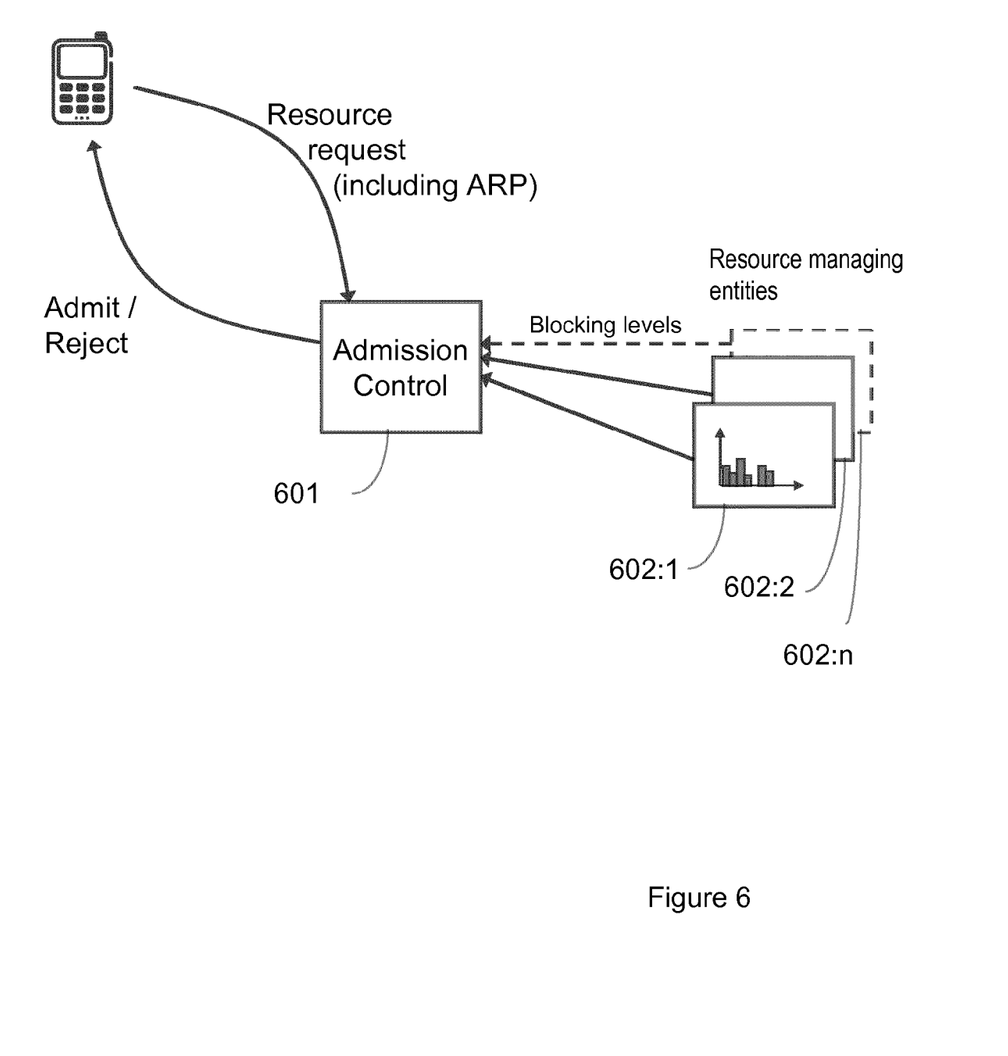
FIG. 6 shows the relation between Admission Control and MSRs, according to an exemplifying embodiment.

Herein, two types of priority blocking levels will be discussed: One type is a priority blocking level BLi, which is determined for a monitored system resource i. This priority blocking level will herein be denoted BLi, "local priority blocking level", or "local BL". These local BLs may be regarded as being calculated locally, for each MSR. The other type is a priority blocking level, BLG, which is calculated "centrally", e.g. by an admission control unit, based on a set of local BLs. This central priority blocking level will herein be denoted BLG, "general priority blocking level", or "general BL". For example, with reference to FIG. 6, the BLG would be determined "centrally" in the admission control 601, and the BLis would be determined "locally", which in FIG. 6 is illustrated as the resource managing entities 602:1-602:n.

Further, different priority levels will be discussed herein. Generally, it could be said that "high" priority represents "high" importance in the system, while "low" or "lower" priority items are less important (than high priority items). In the case of ARP, there are, in an LTE-type system, priority levels with a numbering scheme where the low numbers indicate high priority, and the high numbers indicate low priority. "High" priority could e.g. be defined as ARP Priority level 1-4, and "Low" priority could e.g. be defined as ARP Priority level 10-12.

In order to enable calculation of the ARP blocking levels, the resource usage needs to be registered per ARP level. This means that for dynamic resources each transmission, i.e. the resources utilized for a certain transmission, will need to be "tagged" or associated with the ARP value of the bearer with which the transmission is associated. The principle of tagging utilized resources with an ARP level applies also for static resources, as long as it is possible to associate the resource with an ARP level. Examples when this is true are e.g. context memory per E-RAB and downlink/uplink GBR values requested in GBR QoS Information per E-RAB in S1AP (S1 Application Protocol) procedures, S1 being an interface in LTE.

Also UE-level resources can be registered per ARP level, based on an ARP level assigned to the UE from the ARP levels of its E-RABs. As in the case for an E-RAB level resource, an ARP blocking level can be calculated also in this case. If at the time of the request for the UE-level resource no E-RABs are in place for the UE, one can temporarily meet the request and postpone the final evaluation until E-RABs have been established. A UE not important enough would then return the temporarily assigned UE-level resource and depart from the system.

Figure 5A:
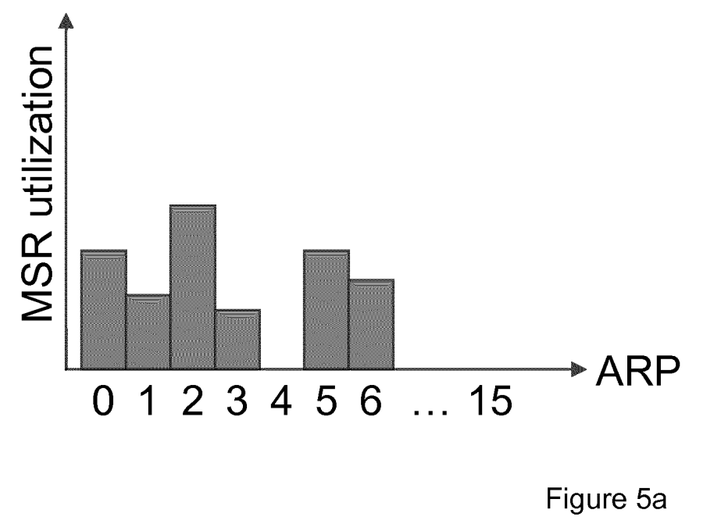
FIG. 5a shows categorizing and/or storing of resource utilization per ARP level for an MSR.

When utilized resources are associated with an ARP value or level, the registered resource usage may be stored e.g. in a histogram fashion, similar to what is shown in FIG. 5a, where each bin corresponds to an ARP level. The ARP levels can be a straight mapping to ARP Priority levels; but e.g. one or more bins may also be used for resource usage related to E-RABs with certain characteristics, such as E-RABs having a Pre-emption Vulnerability set to "not pre-emptable", or for resource usage, which need to be protected for other reasons.

Once the resource usage is collected, a local ARP blocking level may be calculated. For dynamic resources this calculation could be performed e.g. at the expiration of a measurement period, whereas for static resources this calculation may be done e.g. each time the resource situation changes, i.e. at the discontinuity points in the upper diagram in FIG. 1.

The local ARP blocking level could be calculated by summation of the histogram in order of ARP level, starting with the highest priority level, and found e.g. as the first ARP level for which a differentiation threshold is exceeded. This differentiation threshold serves both to shape the traffic, as is the main objective of admission control, and to perform the ARP differentiation, which is a contribution from the herein suggested technology. The differentiation threshold can be viewed as replacing the QoS Threshold, illustrated in FIGS. 2 and 3, for dynamic resources. For static resources, the differentiation threshold appears as a new threshold below the maximum limit of the resource.

Figure 5B:
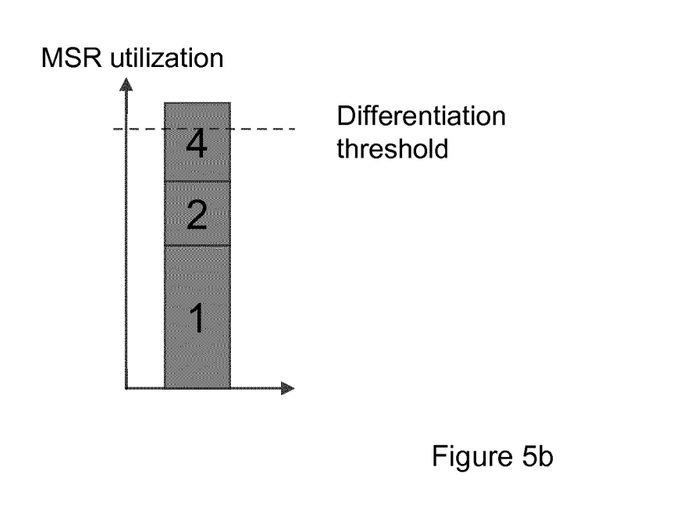
FIG. 5b shows an example of how an ARP blocking level may be found.

The blocking level may be calculated according to equation (1), and is further illustrated by FIG. 5b. In equation 1, the priority blocking level is found as the smallest N that fulfils the inequality to the right side within the brackets. u(n) is the resource utilization for priority level n and T is the threshold:

$$N_b = \underset{N}{\operatorname{argmin}} \left\{ N \,\middle|\, \forall N : \sum_{n=0}^{N} u(n) \geq T \right\} \quad (1)$$

In the example illustrated in FIG. 5b, no requests with a priority lower than or equal to ARP=4 will be admitted. Since, in the example, low numbers indicate high priority, only priority levels associated with a number lower than 4 will be admitted.

There are many system resources, which need to be monitored and taken into consideration by the Admission Control. The solution described above is convenient in that it enables that an admit-or-reject decision is taken centrally within one admission control entity, instead of as before, locally where each MSR is managed. For each MSR a calculated local blocking level can be reported to the central admission control entity e.g. upon changing it, or upon request. The general ARP blocking level to be used by the admission control entity may then be found e.g. as the most aggressive ARP level among the reported local priority blocking levels. FIG. 6 shows a schematic overview of how the admission control entity may interact with the management of MSRs and resource requests according to an embodiment of the herein suggested solution.

In order to maintain good service quality of bearers with a high ARP level in case of air interface congestion, the herein suggested technology can be combined with a scheduler which prioritizes high ARP bearers when the system is congested. The performance of bearers with low ARP can be monitored by a bearer quality based congestion control algorithm that drops bearers with unsatisfying QoS, ensuring that the radio resources are used to maximize the number of fulfilled QoS contracts.

Figure 7:
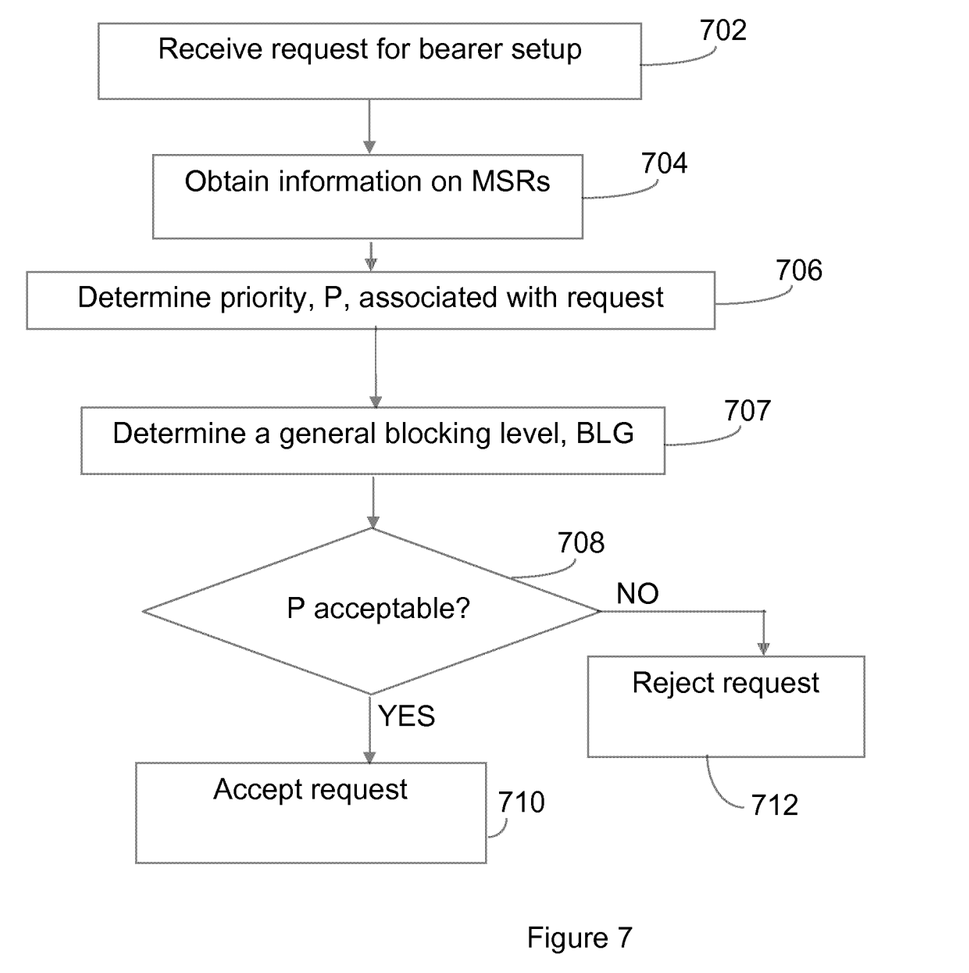
FIG. 7 is a flow chart illustrating a procedure to be performed by a network node according to an exemplifying embodiment.

Exemplifying Procedure, FIG. 7

Below, an exemplifying embodiment of the procedure for admission control in a wireless communication system will be described with reference to FIG. 7. The wireless communication system is preferably, but not necessarily, a system applying shared channels for communication, such as an LTE-type system. The procedure is assumed to be performed in a network node receiving requests for bearer setup, such as a base station, e.g. an eNB, or similar. The network node is assumed to be associated with a number of current bearers, which are already set up, i.e. existing.

A request for a bearer setup is received at the network node in an action 702. The request is sent by a requesting node or entity, such as a UE, which, for example is about to initiate a service, such as e.g. VoIP. In order to determine whether to accept or reject the request, information on the current load situation is needed. This is illustrated as obtaining, e.g. receiving, information about MSRs in an action 704. This information is assumed to be received or retrieved from one or more entities responsible for the monitoring of the different system resources. As previously described, this information is related to local priority blocking levels BLi, preferably calculated for each MSR, which levels may be reported to the network node before, during and/or after the request for bearer set up is received in action 702. For each MSR the local priority blocking level can be reported, e.g. each time it is changed, and the reports are received by the network node. Alternatively, the information or reports could be provided e.g. when requested by the network node, which could then be said to retrieve or collect the information. The information may comprise an explicit local BL or some other indication which enables the network node to derive the correct local blocking level from the indication. Further, an indicated local blocking level may be the priority level which should be blocked, or e.g. the lowest priority level which should be accepted.

A local priority blocking level BLi is determined, e.g. for each MSR, i, based on the usage of resource i of existing bearers, i.e. bearers which are already set up, where the resource usage is registered or associated with priority levels P, such as ARP levels. The determining further involves a predefined criterion, e.g. in form of a differentiation threshold related to the usage of resource i. In a specific solution there is only one differentiation threshold per monitored system resource i.

The request for bearer set up is associated with a priority level or value P, which is determined (identified) by the network node, here illustrated as an action 706. Further, a general priority blocking level BLG is determined in action 707, based on the reports, i.e. the information on local priority blocking levels. The determining of the local and general priority blocking levels have been previously discussed, e.g. in association with FIG. 5b.

It is decided in an action 708 whether to accept or reject the request for a bearer setup, based on the priority level P and the general priority blocking level BLG. As previously described, the priority level P could be compared to the general priority blocking level BLG according to a predefined criterion, and depending on how the criterion for comparison is formulated, the request may be e.g. rejected when the criterion is fulfilled and accepted when the criterion is not fulfilled. Generally could be said that the request should be rejected when the priority level P is too low, i.e. does not fulfill a predefined criterion in relation to the general blocking level BLG. For example, the priority level P could be considered to be too low when the priority level P is lower than the BLG, or alternatively when the priority level P is lower than or equal to the BLG. The definition of what is considered as "too low" in relation to a BLG is assumed to be preconfigured. The accepting and rejecting of the request is illustrated as the respective actions 710 and 712 in FIG. 7.

Figure 8:
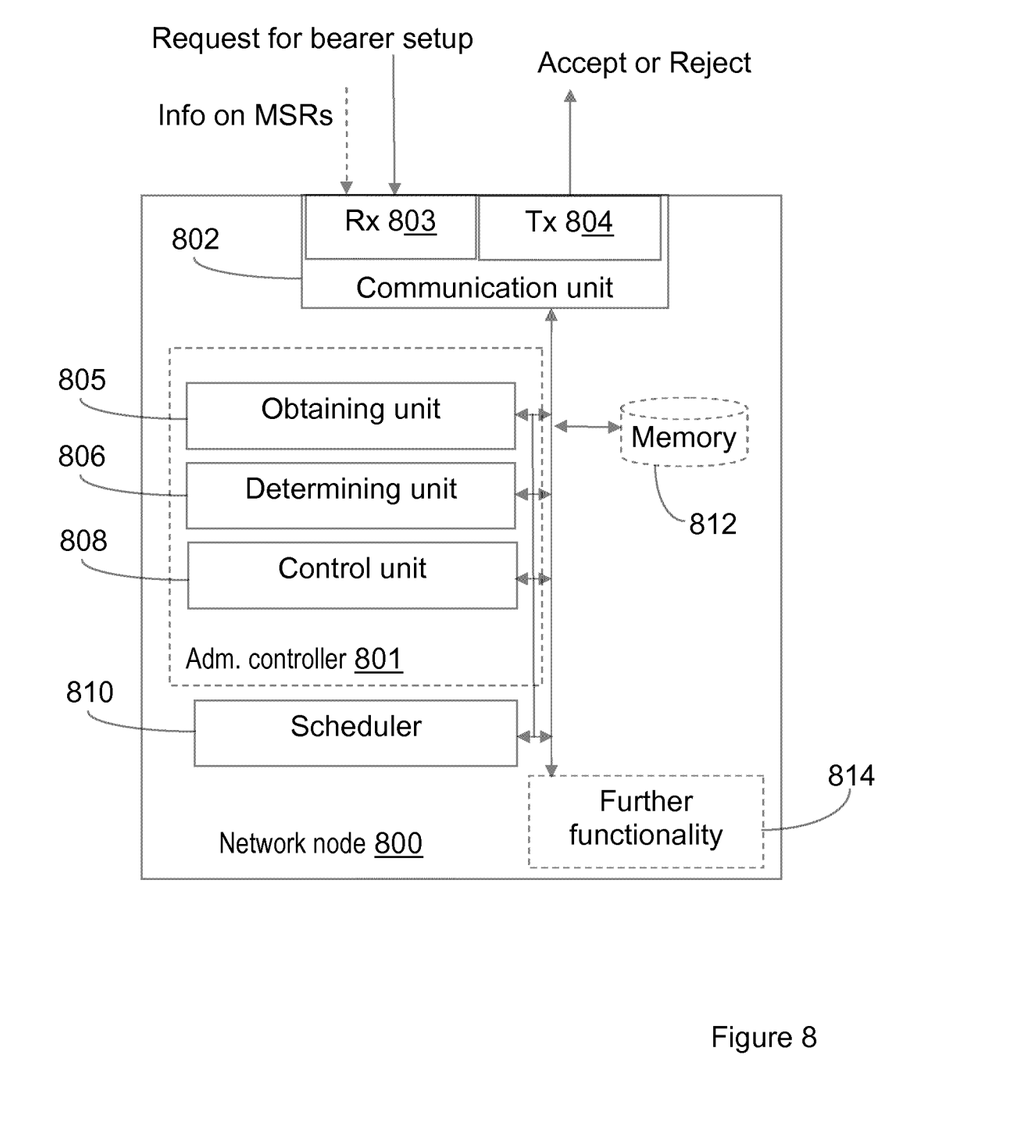
FIGS. 8 and 9 are block charts illustrating arrangements according to exemplifying embodiments.

Exemplifying Arrangement, FIG. 8

Below, an example arrangement in a network node 800 adapted to enable the performance of the above described procedure will be described with reference to FIG. 8. The network node is operable in a wireless communication system. As previously stated in conjunction with FIG. 6, the wireless communication system is preferably, but not necessarily, a system applying shared channels for communication, such as an LTE-type system. The network node could be a base station, such as an eNB in an LTE-type system, or an MCE (Multi-cell/multicast Coordination Entity) in an LTE-type system. The network node 800 is illustrated as to communicate with other entities via a communication unit 802, comprising a receiver 803 and a transmitter 804. The network node may comprise functional units 814, such as e.g. functional units managing system resources, monitoring system resources and calculating local priority blocking levels, as previously described. The network node may further comprise one or more storage units 912.

The arrangement or network node, or parts thereof, could be implemented e.g. by one or more of: a processor or a micro processor and adequate software and memory for storing thereof, a Programmable Logic Device (PLD) or other electronic component(s) or processing circuitry configured to perform the actions described above.

The network node comprises a receiver, which is adapted to receive a request for a bearer setup from a requesting network node. The request is assumed to be associated with a priority level, P. The network node further comprises an admission controller 801, adapted to decide whether to accept or reject the request based on the priority level P and a general priority blocking level BLG, where BLG is determined based on reports indicating a priority blocking level BLi per monitored system resource, i, needed for setting up a bearer.

The admission controller could be illustrated and described as comprising an obtaining unit 805 for obtaining or receiving the request for a bearer setup, or an indication thereof, from the receiver 804 and communication unit 802. The obtaining unit 805 is also adapted to receive or retrieve information, here denoted reports, indicating a priority blocking level, BLi, per monitored system resource, i, needed for setting up a bearer. The reports could be obtained from one or more entities managing a system resource, located either within the network node 800, or outside the network node. The admission controller could further comprise a determining unit 806, adapted to determine a general priority blocking level BLG, based on the reports. The determining unit 806 could further be adapted to determine or decide whether to accept or reject the request for a bearer setup based on the priority level P and the general priority blocking level BLG.

The admission controller 801 could further be described as comprising a control unit, adapted to accept or reject the request for a bearer setup. For example, a response message indicating that the request is rejected or accepted could be provided to the requesting network node.

Figure 9:
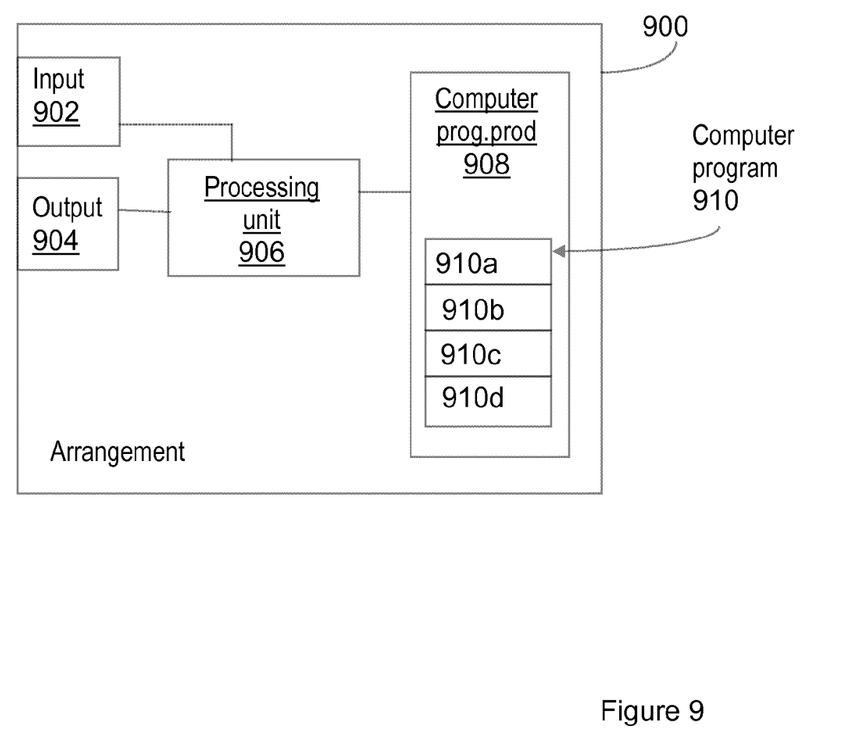

Exemplifying Arrangement, FIG. 9

FIG. 9 schematically shows a possible embodiment of an arrangement 900, which also can be an alternative way of disclosing an embodiment of the admission controller 801 in the network node 800 illustrated in FIG. 8. Comprised in the arrangement 900 are here a processing unit 906, e.g. with a DSP (Digital Signal Processor). The processing unit 906 may be a single unit or a plurality of units to perform different actions of procedures described herein. The arrangement 900 may also comprise an input unit 902 for receiving signals from other entities or nodes, and an output unit 904 for providing signals to other entities or nodes. The input unit 902 and the output unit 904 may be arranged as an integrated entity.

Furthermore, the arrangement 900 comprises at least one computer program product 908 in the form of a non-volatile memory, e.g. an EEPROM (Electrically Erasable Programmable Read-Only Memory), a flash memory and a hard drive. The computer program product 908 comprises a computer program 910, which comprises code means, which when executed in the processing unit 906 in the arrangement 900 causes the arrangement and/or a node in which the arrangement is comprised to perform the actions e.g. of the procedure described earlier in conjunction with FIG. 7.

The computer program 910 may be configured as a computer program code structured in computer program modules. Hence, in an exemplifying embodiment, the code means in the computer program 910 of the arrangement 900 may comprise an obtaining module 910a for obtaining a request for a bearer setup or an indication thereof, and reports indicating a priority blocking level, BLi, per monitored system resource, i, needed for setting up a bearer. The arrangement 900 may further comprise a determining module 910b for determining a priority level P, associated with the request, a general priority blocking level BLG and for determining or deciding whether to accept or reject the request based the general priority blocking level BLG.

The computer program may further comprise a control module 910c for accepting or rejecting the request. The computer program 910 may further comprise one or more additional modules 910d for providing e.g. scheduling functions.

The modules 910a-c could essentially perform the actions of the flows illustrated in FIG. 7, to emulate the admission controller 800 in the network node illustrated in FIG. 8.

Although the code means in the embodiment disclosed above in conjunction with FIG. 9 are implemented as computer program modules which when executed in the processing unit causes the decoder to perform the actions described above in the conjunction with figures mentioned above, at least one of the code means may in alternative embodiments be implemented at least partly as hardware circuits.

A previously mentioned, the processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

While the method and network node or arrangement for admission control as suggested above has been described with reference to specific embodiments provided as examples, the description is generally only intended to illustrate the suggested technology and should not be taken as limiting the scope of the suggested methods and arrangements, which are defined by the appended claims. While described in general terms, the method and arrangement may be applicable e.g. for different types of communication systems applying shared channels for communication.

It is also to be understood that the choice of interacting units or modules, as well as the naming of the units are only for exemplifying purpose, and nodes suitable to execute any of the methods described above may be configured in a plurality of alternative ways in order to be able to execute the suggested process actions. It should also be noted that the units or modules described in this disclosure are to be regarded as logical entities and not with necessity as separate physical entities.

ABBREVIATIONS

EPS Evolved Packet System
E-RAB Evolved Radio Access Bearer
GBR Guaranteed Bit Rate
LTE Long Term Evolution
MSR Monitored System Resource
PRB Physical Resource Block
QoS Quality of Service
RAB Radio Access Bearer
VoIP Voice over Internet Protocol

The invention claimed is:

1. A method for admission control in a network node in a wireless communication system, the method comprising:
receiving, from a requesting entity, a request for a bearer setup, the request associated with a priority level P;
obtaining one or more reports indicating a priority blocking level (BLi) per monitored system resource i of a plurality of monitored system resources needed for setting up a bearer;
determining a general priority blocking level (BLG) based on the one or more reports; and
deciding whether to accept or reject the request for a bearer setup based on the priority level P and the general priority blocking level BLG; and
wherein the plurality of monitored system resources comprise dynamic resources, in which usage of the dynamic resources is allowed to vary during the lifetime of a setup bearer.

2. The method of claim 1, wherein each priority blocking level BLi is based on usage of resource i per priority level P of existing bearers and a predefined criterion.

3. The method of claim 2, wherein the predefined criterion is a threshold value related to resource usage of resource i.

4. The method of claim 1:
wherein each priority blocking level BLi indicates a priority blocking level for resource i;
wherein a request for a bearer setup associated with a priority level P, which does not fulfill a predefined criterion in relation to the indicated priority blocking level, is rejected.

5. The method of claim 1:
wherein priority blocking level BLi is calculated as the priority level associated with the used resources, for which, when added to a sum, the sum fulfills the predefined criterion; and
wherein the sum is created by adding the number of used resources per priority level together, in descending priority level order, starting with the highest priority level.

6. The method claim 1, wherein the general priority blocking level BLG is determined as the priority blocking level associated with a highest priority level of the respective priority blocking levels BLi.

7. The method of claim 1, wherein the priority level P is an allocation and retention priority level.

8. The method of claim 1, wherein the request is for setup of a radio bearer or a transport bearer.

9. The method of claim 1, wherein the request is for setup of an Evolved Radio Access Bearer (E-RAB).

10. The method of claim 1:
wherein the request is for a User Equipment-level resource; and
wherein the priority level assigned to the request and/or User Equipment is determined from the priority level of its Evolved Radio Access Bearers.

11. The method claim 1, further comprising indicating the outcome of the deciding to the requesting entity.

12. The method of claim 1, wherein the determining the BLG comprises determining centrally at the network node a single admission's threshold that represents the multiple BLi's indicated in the one or more reports received from a plurality of other network nodes.

13. The method of claim 1 wherein the plurality of monitored system resources further comprise static resources, in which usage of the static resources is not allowed to vary during the lifetime of a setup bearer.

14. The method of claim 1, wherein the determining the BLG based on the one or more reports comprises determining the BLG based on a plurality of BLi's indicated in the one or more reports.

15. A network node operable in a wireless communication system, the network node comprising:
a receiver adapted to receive a request for bearer setup from a requesting entity, the request associated with a priority level P; and
an admission control circuit adapted to decide whether to accept or reject the request based on the priority level P and a general priority blocking level (BLG); and
wherein BLG is determined based on one or more reports indicating a priority blocking level (BLi) per monitored system resource i of a plurality of monitored system resources needed for setting up a bearer; and
wherein the plurality of monitored system resources comprise dynamic resources, in which usage of the dynamic resources is allowed to vary during the lifetime of a setup bearer.

16. The network node of claim 15, wherein each priority blocking level BLi is based on usage of resource i per priority level P of existing bearers and a predefined criterion.

17. The network node of claim 16, wherein the predefined criterion is a threshold value related to resource usage of resource i.

18. The network node of claim 15:
wherein each priority blocking level BLi indicates a priority blocking level for resource i; and
wherein a request for a bearer setup associated with a priority level P which does not fulfill a predefined criterion in relation to the indicated priority blocking level is rejected.

19. The network node of claim 15:
wherein priority blocking level BLi is calculated as the priority level associated with the used resources, for which, when added to a sum, the sum fulfills the predefined criterion; and
wherein the sum is created by adding the number of used resources per priority level together, in descending priority level order, starting with the highest priority level.

20. The network node of claim 15, wherein the general priority blocking level BLG is determined as the priority blocking level BLi associated with a highest priority level of the respective priority blocking levels BLi.

21. The network node of claim 15, wherein the priority level P is an allocation and retention priority level.

22. The network node of claim 15, wherein the request is for setup of a radio bearer or a transport bearer.

23. The network node of claim 15, wherein the request is for setup of an Evolved Radio Access Bearer (E-RAB).

24. The network node of claim 15:
wherein the request is for a UE-level resource; and
wherein the priority level assigned to the UE is determined from the priority level of its Evolved Radio Access Bearers.

25. The network node of claim 15, wherein the network node is configured to indicate the outcome of the deciding to the UE.

26. A computer program product stored in a non-transitory computer readable medium for controlling admission control in a network node in a wireless communication system, the computer program product comprising software instructions which, when run on one or more processing circuits of the network node, causes the network node to:
receive, from a requesting entity, a request for a bearer setup, the request associated with a priority level P;
obtain one or more reports indicating a priority blocking level (BLi) per monitored system resource i of a plurality of monitored system resources needed for setting up a bearer;
determine a general priority blocking level (BLG) based on the one or more reports; and
decide whether to accept or reject the request for a bearer setup based on the priority level P and the general priority blocking level BLG; and
wherein the plurality of monitored system resources comprise dynamic resources, in which usage of the dynamic resources is allowed to vary during the lifetime of a setup bearer.

* * * * *